US010173643B2

(12) United States Patent
Myers et al.

(10) Patent No.: US 10,173,643 B2
(45) Date of Patent: Jan. 8, 2019

(54) OBJECT DETECTION FOR VEHICLES

(71) Applicant: Ford Global Technologies, LLC, Dearborn, MI (US)

(72) Inventors: Scott Vincent Myers, Camarillo, CA (US); Parsa Mahmoudieh, Vallejo, CA (US); Maryam Moosaei, Mishawaka, IN (US); Madeline J. Goh, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/437,107

(22) Filed: Feb. 20, 2017

(65) Prior Publication Data

US 2018/0236975 A1 Aug. 23, 2018

(51) Int. Cl.
*G06K 9/00* (2006.01)
*B60R 25/25* (2013.01)

(52) U.S. Cl.
CPC ............ *B60R 25/25* (2013.01); *G06K 9/0061* (2013.01); *G06K 9/00255* (2013.01); *G06K 9/00288* (2013.01); *G06K 9/00791* (2013.01)

(58) Field of Classification Search
CPC ............ G06K 9/00797; G06K 9/00288; G06T 2207/10016; G06T 2207/30256; G07C 9/00111; B60N 2/002; B60R 1/00; B60R 25/25; G08G 1/04; B60W 40/08; B60H 1/00742
See application file for complete search history.

(56) References Cited

U.S. PATENT DOCUMENTS

| 8,836,491 | B2 | 9/2014 | Rao et al. |
| 8,854,465 | B1 | 10/2014 | McIntyre |
| 8,948,442 | B2 | 2/2015 | Breed et al. |
| 9,000,907 | B1 | 4/2015 | Rembach et al. |
| 9,816,308 | B2 * | 11/2017 | Myers .................... E05F 15/73 |
| 2004/0240711 | A1 | 12/2004 | Hamza et al. |
| 2006/0082437 | A1 * | 4/2006 | Yuhara ................... B60R 25/04 340/5.82 |
| 2008/0224859 | A1 * | 9/2008 | Li ...................... G07C 9/00087 340/540 |
| 2009/0090577 | A1 * | 4/2009 | Takahashi .............. A61B 5/117 180/272 |

(Continued)

FOREIGN PATENT DOCUMENTS

| CN | 201201570 Y | 3/2009 |
| DE | 102011011939 A1 | 8/2012 |

(Continued)

OTHER PUBLICATIONS

GB Search Report for Application No. GB 1802478.6, dated Nov. 24, 2018, 6 Pages.

*Primary Examiner* — Amir Alavi
(74) *Attorney, Agent, or Firm* — Brooks Kushman P.C.

(57) ABSTRACT

A vehicle includes a pair of cameras disposed on the vehicle and oriented to view an entrance to the vehicle. The vehicle also includes a processor configured to compare a profile image of a passenger's facial feature from one of the pair with a frontal image of the passenger's facial feature from the other of the pair. The processor is configured to lock the entrance to the vehicle in response to the facial features being different.

19 Claims, 5 Drawing Sheets

(56) References Cited

U.S. PATENT DOCUMENTS

| | | | |
|---|---|---|---|
| 2009/0284598 A1* | 11/2009 | Busch | B60R 1/00 |
| | | | 348/148 |
| 2010/0148923 A1 | 6/2010 | Takizawa | |
| 2013/0073114 A1* | 3/2013 | Nemat-Nasser | B60W 40/09 |
| | | | 701/1 |
| 2015/0102898 A1* | 4/2015 | Huennekens | G07C 9/00111 |
| | | | 340/5.6 |
| 2016/0078737 A1 | 3/2016 | Cohen et al. | |
| 2017/0043783 A1* | 2/2017 | Shaw | B60H 1/00978 |
| 2018/0002972 A1* | 1/2018 | Myers | E05B 81/08 |
| 2018/0082557 A1* | 3/2018 | Billau | G07C 9/00309 |
| 2018/0099646 A1* | 4/2018 | Karandikar | B60S 1/0844 |

FOREIGN PATENT DOCUMENTS

| | | |
|---|---|---|
| EP | 2500218 A1 | 9/2012 |
| WO | 2002086825 A1 | 10/2002 |
| WO | 2016162225 A1 | 10/2016 |

\* cited by examiner

OBJECT DETECTION FOR VEHICLES

TECHNICAL FIELD

The present disclosure relates to object detection for vehicles.

BACKGROUND

Taxi services impose numerous risks to travelers. Quite often articles are inadvertently left within the interior of a vehicle as passengers scramble to enter and exit a cab. Autonomous vehicles present additional issues because passenger behavior is unchecked, leaving opportunities for ride stealing or abandonment of articles.

SUMMARY

A vehicle includes a pair of cameras disposed on the vehicle and oriented to view an entrance to the vehicle. The vehicle also includes a processor configured to compare a profile image of a passenger's facial feature from one of the pair with a frontal image of the passenger's facial feature from the other of the pair. The processor is configured to lock the entrance to the vehicle in response to the facial features being different.

A vehicle includes a pair of cameras disposed on the vehicle and oriented to view an entrance to the vehicle from different aspects. The vehicle includes a processor configured to compare a profile image of a passenger from one of the pair with a frontal image of the passenger from the other of the pair. The processor is configured to disable the vehicle. The processor may disable the vehicle in response to the front and profile images corresponding to different shapes for a same facial structure.

A vehicle includes a processor configured to provide notification to the passenger that the object was left in the vehicle. The processor may provide the notification in response to a visual detector having a pair of cameras disposed in the vehicle and oriented to view an interior of the vehicle from different aspects recognizing an object in images taken by the pair after a passenger exits the vehicle. The processor may provide the notification in response to a mass detector having a scale disposed in the vehicle sensing a weight of the object after the passenger exits the vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

With the advent of autonomous vehicles, autonomous taxicabs may pick up and drop off passengers without human drivers. Multiple passengers may be loaded in the vehicle at different times known as ride chaining or sharing. Passengers may request a pickup through an application or other means and send identification to the driver or autonomous vehicle. Passengers may be required to wait during high volume periods. Disobedient or defiant passengers may attempt to steal transport vehicles intended for other passengers in order to expedite their travel. A facial detection and recognition system may be used to determine whether a passenger has requested or reserved the given transport vehicle. The vehicle may request and receive a passenger profile including identification photographs of the intended passengers or requesting passengers. The vehicle may compare entering passengers with the passenger manifest and provide feedback to passengers either notifying them of their unapproved status or preventing access to the passenger compartment.

Mischievous passengers may attempt to impersonate or otherwise conceal their identity. For example, if the victim of the ride theft is known, a picture may be held in front of the ride thief's face to impersonate the victim. In a more elaborate scheme, a ride thief may create masks to impersonate a passenger. A facial detection and recognition system may be further capable of thwarting ride thieves and alleviating other autonomous taxi issues.

Figure 1:
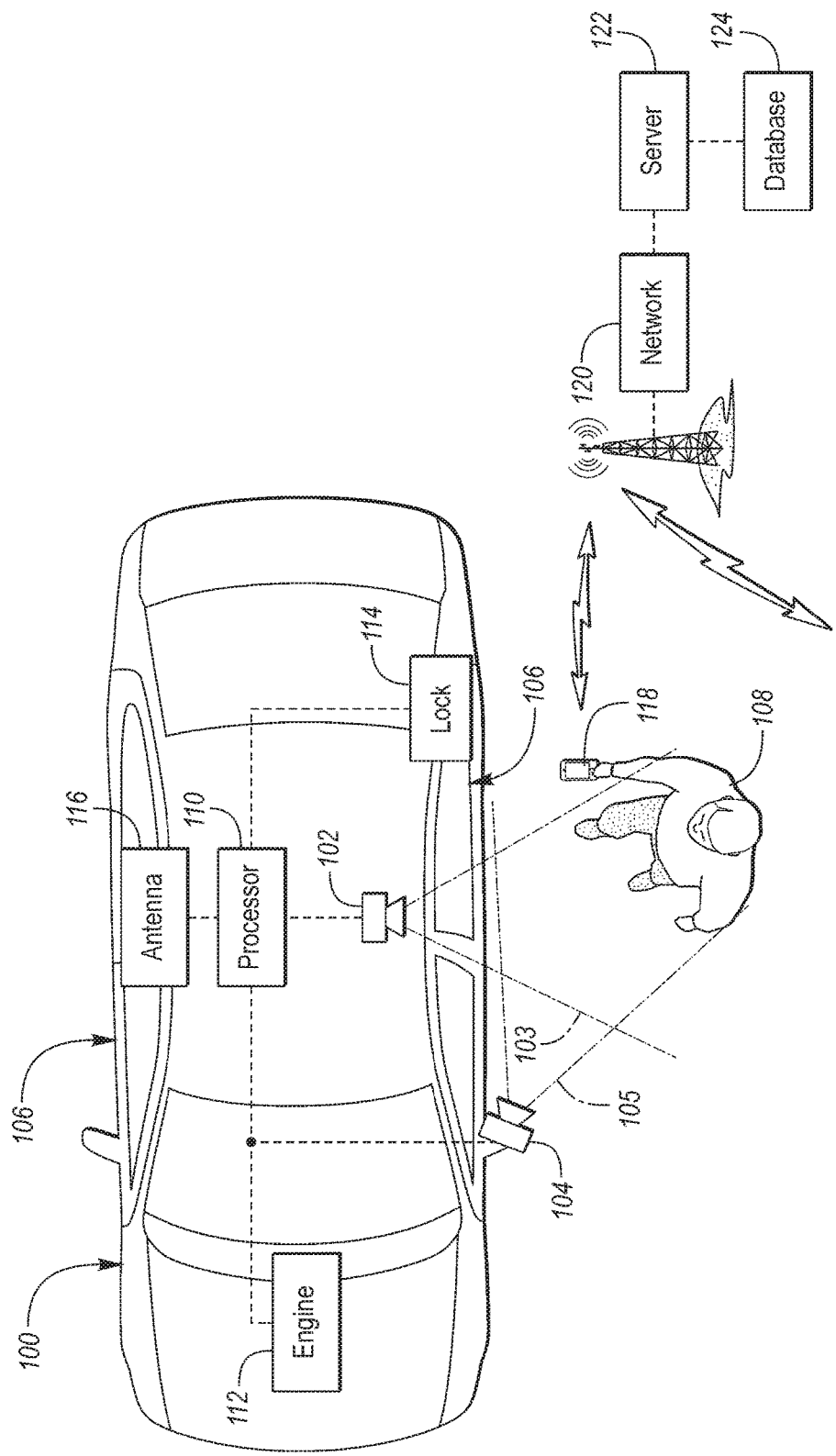
FIG. 1 is a plan view of a vehicle having at least a pair of cameras oriented to view an entrance of a vehicle or photographically capture an entrant.

Referring to FIG. 1, a vehicle 100 includes a pair of cameras 102, 104 disposed on the vehicle and in view of an entrance 106 of the vehicle having fields of view 103, 105, respectively. A vehicle may be any type of transit system that includes busses, vans, trains, planes, boats, and automobiles. In another embodiment, the cameras 102, 104 may be disposed near a taxi line or taxi pickup area to monitor all taxis ingress and egress. Cameras 102, 104 may be situated all around the vehicle 100 and pointed at each entrance 106 to the vehicle from various angles. Any kind of camera may be used. As a passenger 108 approaches the vehicle 100, a processor 110 associated with the cameras 102, 104 may perform a face detection algorithm (e.g., Eigen-faces) to identify the passenger's face. After the face is detected, a face recognition algorithm (e.g., Principal Component Analysis; Linear Discriminant Analysis; Elastic Bunch Graph Matching; Hidden Markov Model; Multilinear Subspace Learning; and Dynamic Link Matching) may compare the passenger's face to the picture provided on the passenger manifest. After a match is found, the processor may determine whether an impersonation has taken place.

The processor 110 may use another set of algorithms to detect whether the profile image and the frontal image are the same. The processor may detect abnormalities by using a composite or three-dimensional structure of the two images. Another algorithm may compare facial features of the two images. Facial features, as described in further detail below, may include eyes, eye sockets, chins, noses, eyebrows, hairlines, lip features, ears, and cheek structure. Aside from facial features, the processor 110 may perform DNA matching, retina matching, vein matching, voiceprint matching, password matching, wireless protocol authentication.

The processor 110 may be a standalone processor or a portion of the vehicle control system. While illustrated as one processor, processor 110 may be part of a larger control system and may be controlled by various other controllers throughout the vehicle 100, such as a vehicle system controller (VSC). It should therefore be understood that the processor 110 and one or more other processors or controllers can collectively be referred to as a "processor" that uses various algorithms to control the vehicle in response to signals from various sensors to control functions such as starting/stopping engine 112 and actuating the lock 114 to the entrance 106. Processor 110 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The processor 110 may control the vehicle 100 entrance 106 by a lock 114. The processor 110 may engage the lock 114 to prevent access to the entrance until access is granted or disengage the lock 114 until access is denied. The lock 114 system may be a standard vehicle lock system with a processor purposed to deny access to unauthorized passengers.

The processor 110 may be configured to communicate off board through an antenna or antenna system 116. The antenna may be configured to communicate over various mediums and frequencies and protocols (e.g., Bluetooth, CDMA, 802.11, SS7, MAP, Wi-Fi). The processor 110 may receive pickup requests from passengers through the antenna 116, along with passenger manifests and pictures. The antenna 116 may provide a means of communication between the processor 110 and various other networks and systems. For example, the processor 110 may have access to passenger cellular numbers to send text messages or otherwise communicate passenger cellphones 118. The processor 110 may be configured to communicate with network 120 in order to receive passenger manifests and pickup location information from a server 122. The server 122 may retain passenger information in a database 124 and provide the vehicle 100 with access to that information.

A network connected vehicle 100 may send passenger 108 information to the server 122 for validation. In this configuration, processing power required for recognition is offloaded to the server 122. The server 122 may communicate with the vehicle 100 over encrypted and secured communication methods (e.g., TLS, IPSec) to prevent interception and alteration of the information. The processor 110 may upload images received to the server 122 for recognition.

Figure 2:
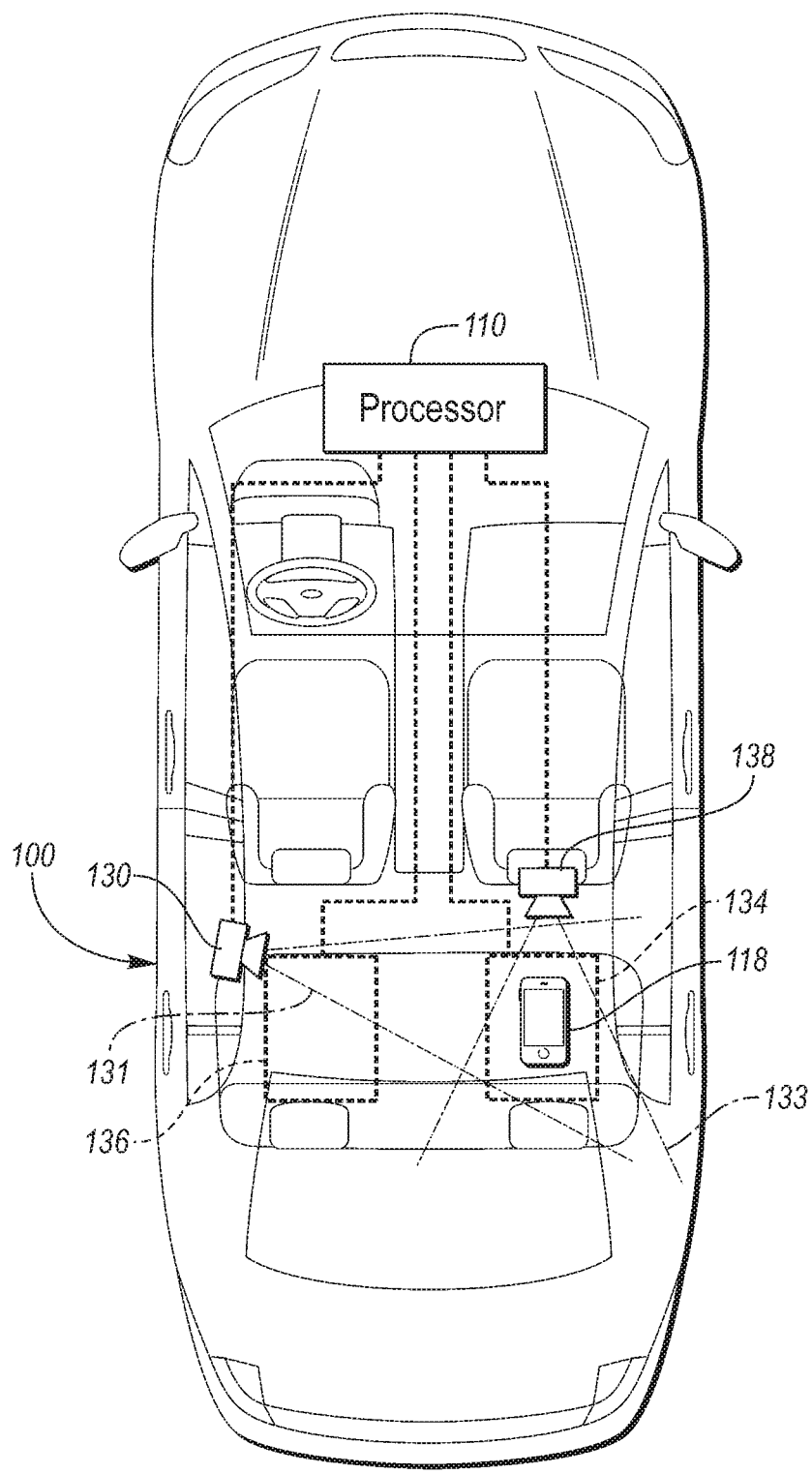
FIG. 2 is an overhead view of a vehicle having weight sensors and at least a pair of cameras oriented to detect objects within the passenger compartment.

Now referring to FIG. 2, a vehicle 100 is shown having a pair of cameras 130, 132 disposed to view an interior of the vehicle 100 having fields of view 131, 133, respectively. The cameras 130, 132 may be disposed to view the interior at different angles. The processor 110 may be configured to retrieve images from the cameras 130, 132 and detect objects 118. The cameras 130, 132 may detect objects 118 possessed by a passenger and track those objects 118 throughout the ride. Object detection may be performed using a variety of methods. Some methods may be used in conjunction with one another. For example, the processor 110 may detect objects using edge detection or object recognition. One form of object recognition may use Eigenpictures, similar to face recognition. A database 124 may house the Eigenpictures. The pictures captured by the cameras 130, 132 may be sent off-board to a server 122 for processing. Objects 118 may be cellular phones or larger transportable devices.

In addition to visual inspection, the vehicle 100 may include weight based sensors 134, 136 to determine when a passenger has left, and when an object 118 has been left somewhere in the vehicle. The weight sensors 134, 136 may be dispersed throughout the vehicle interior. The weight sensors 134, 136 may be on the floors, in containers, and on each of the passenger seating areas. The weight sensors 134, 136 may be disposed in storage compartments (e.g., trunk) as well.

The processor 110 may be configured to determine when the object 118 is left in the vehicle. For example, a passenger 108 may be assigned a unique line number in a database. All of the objects 118 associated with the passenger 108 may be tracked in the database. The processor 110 may determine when the passenger 108 has left the vehicle. The processor 110 may be programmed to further determine an object 118 is left in the vehicle when the object 118 is not in proximity to any passengers or in an unusual location (e.g., on the floor). The processor 110 may correlate information related to the visual analysis with information from the weight analysis. For example, if an object is detected in an unusual area and the weight sensor detects the same object 118, the processor 110 may perform a function to alert the passengers (e.g., disable the vehicle, text the passenger who was seated in that area, text all of the passengers that an object or article was left, honk the horn, adjust the lights, provide notifying voice commands). The function may be based on the type of object detected. For example, if a cellphone is detected, the vehicle may honk the horn. If a book is detected, the vehicle may send a text message to the passenger's cellphone. The processor 110 may use the visual object detection to predict a weight associated with the object 118. For example, if the visual object detection determines that the object 118 left behind is a cellular phone, the processor 110 may compare the weight of the object 118 that was left to an expected weight of the object 118. If the difference in weight is within an expected band (e.g., within 5% of the expected weight) then the processor may alert the passengers that an object 118 was left. This comparison may result in a reduction of false positives.

Figures 3A, 3B:
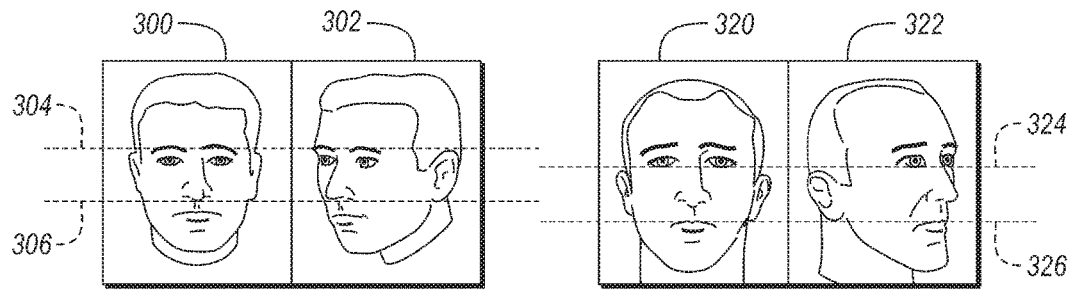
FIG. 3A is a front and profile view of a passenger.
FIG. 3B is a front and profile view of another passenger.

Referring to FIG. 3A, a passenger frontal and profile images 300, 302 are shown. The features of both images 300, 302 correspond and are aligned, as shown with the feature lines 304, 306. The feature lines 304, 306 indicate significant locations of the passengers features. For example, the feature line 304 is aligned with the passenger's eyebrows in both the frontal and profile images 300, 302. The feature line 304 is also aligned with the top edge of the passenger's ear. An additional feature line 306 is aligned with the point of the passenger's nose and the lower edge of the passenger's ear. The feature lines 304, 306 may be used to compare one passenger to another. For example, the frontal and profile images 320, 322 of FIG. 3B are shown. The features of both images 320, 322 correspond and are aligned, as shown with the feature lines 324, 326. The feature lines 324, 326 indicate significant locations of the passengers features. For example, the feature line 324 is aligned with the passenger's eyebrows in both the frontal and profile images 320, 322. The feature line 324 is also aligned with the top edge of the passenger's ear. An additional feature line 326 is aligned with the point of the passenger's nose and the lower edge of the passenger's ear. A processor 110 may be configured to detect the facial features described through various algorithms (e.g., Local Binary Pattern, Haar features). Similar algorithms may compare locations of facial features from the frontal and profile images 300, 302, 320, 322 to determine whether an imposter is present.

Figure 4A:
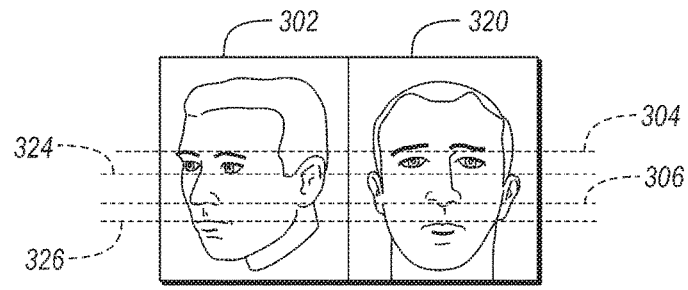
FIG. 4A is a comparison of a profile view of one passenger with the front view of a second passenger.

Referring to FIG. 4A, a comparison of image 302 and 320 is shown. An algorithm, as mentioned above, is used to determine the location of features as shown in lines 304, 306. The lines 304, 306 are aligned with the eyebrows and nose of both images. The lines 304, 306, however, are aligned with the ears in image 302, yet the lines 324, 326 are aligned with the ears in image 320. In response to this determination, that the ears to do not have the same relative locations, the processor 110 may indicate that an impersonation is occurring.

Figure 4B:
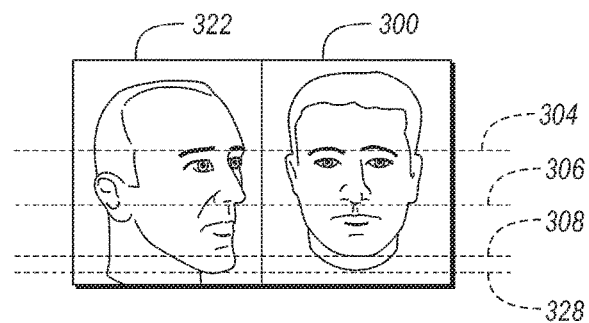
FIG. 4B is a comparison of a front view of the one passenger with the profile view of the second passenger.

Referring to FIG. 4B, a comparison of image 300 and 322 is shown. An algorithm, as mentioned above, is used to determine the location of features shown in lines 304, 306, 308, 310. Lines 304, 306 correspond to the eyebrows and noses in both images 300, 322. Lines 308, 328 correspond to chin features in both images 300, 322, which are misaligned. An algorithm running on processor 110 may determine that the chin features are not the same and provide indication that an impersonation is occurring.

Figure 5:
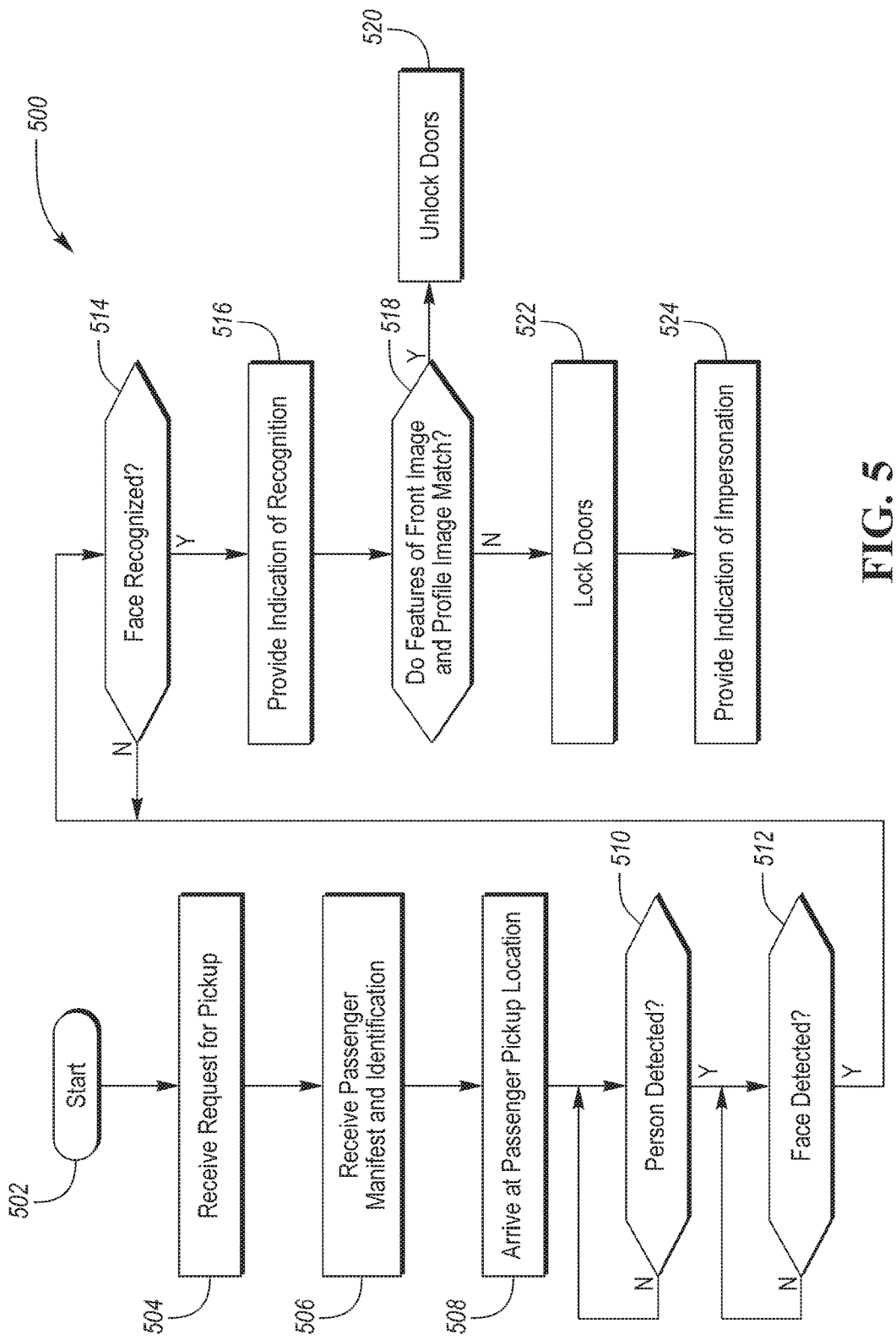
FIG. 5 is a flow diagram of detecting an imposter.

Referring to FIG. 5, an imposter recognition flow diagram 500 is shown. Step 502 begins the process. In step 504, the processor 110 or cluster receives a request for pickup. The request may be first received at a server and transmitted to the vehicle 100 once payment or other requirements have been completed. In step 506, the processor 110 may receive a passenger manifest and identification information from the server 122. The identification information may include an image of the passenger for facial recognition and facial feature information for detecting imposters. In step 508 the vehicle 100 arrives at the passengers requested pickup location. Upon arrival, the processor 110 may determine whether a human object is present at the pickup location in step 510. In step 512, the processor 110 may attempt to detect a face using the aforementioned algorithms. If a face is detected, the processor 110 may attempt to recognize the face by comparing the received image with the images from the passenger manifest. The vehicle 100 may provide an indication to the passenger that the face was recognized through a horn beep or visual indication.

The processor 110 may be further configured to determine whether an imposter has attempted to gain access to the vehicle in step 518. As mentioned above, a profile image may be compared with a frontal image or two different images may be compared to ensure that one view of the passenger coincides with another view of the passenger. If the images match, the doors are unlocked in step 520. If the features do not match, the doors are locked in step 522. The doors may be configured to be locked by default and unlocked in response to a match or unlocked by default and locked by a non-match. In step 524, indication is provided to the passenger or person that an impersonation has been detected. The indication may be a particular cadence of sounds, an alarm, or a visual indication. Any of the steps of algorithm 500 may be performed in a different sequence depending on the preferences of the autonomous design.

The comparison may be completed through a composite model of the two images. The composite may be a three-dimensional model of the two images. In response to an error in the creation of the three-dimensional model, the doors may be locked and entrance to the vehicle prohibited. For example, if an algorithm for generating a three-dimensional model from two images has error generation to prevent invalid models, the error generation may indicate an impostor is trying to gain access to the vehicle. The access is then prevented. More than two images may be used to generate the composite. The generation of three-dimensional models are known in the art (e.g., stereoscopic 3D).

Figure 6:
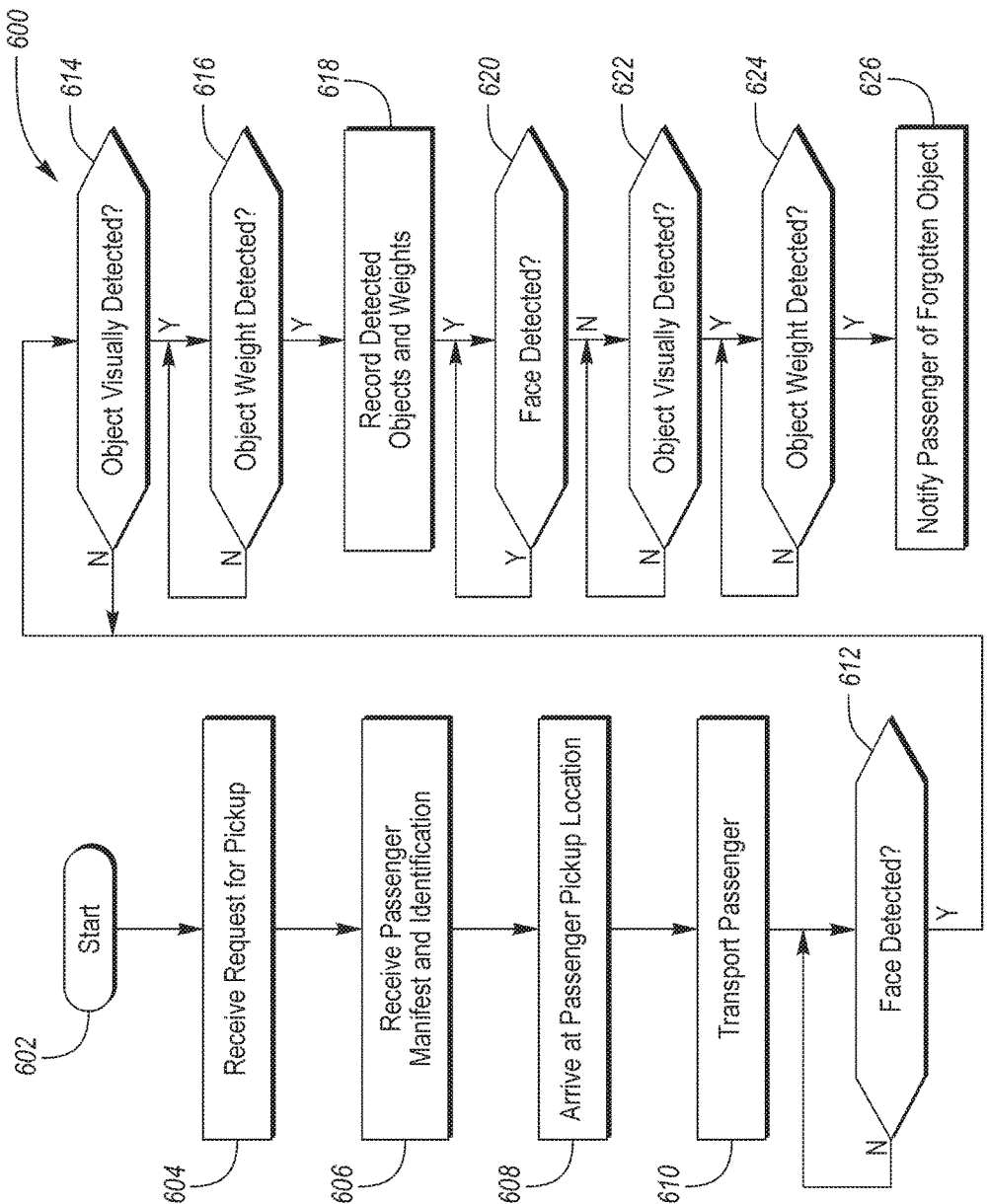
FIG. 6 is a flow diagram of detecting an object left in the vehicle.

Referring to FIG. 6, an object detection algorithm 600 is depicted. In step 602, the algorithm begins. In step 604, the processor 110 or cluster receives a request for pickup. The request may be first received at a server and transmitted to the vehicle 100 once payment or other requirements have been completed. In step 606, the processor 110 may receive a passenger manifest and identification information from the server 122. The identification information may include an image of the passenger for facial recognition and facial feature information for detecting imposters. In step 608 the vehicle 100 arrives at the passengers requested pickup location. In step 610, transportation of the passenger begins. In step 612, face detection may be performed to determine the location of the passenger and recognition may be performed to ensure that the passenger is on the manifest. The passenger may be identified in a database and the processor 110 may track any objects identified as being associated with the passenger. Object detection may be performed by any algorithm known to those with skill in the art. Object detection may also include near field communications with electronic devices. In step 614, objects associated with each passenger are detected and recorded for monitoring. In step 616, objects detached from passengers may be detected in other areas of the vehicle for tracking. For example, luggage in a luggage compartment or objects placed on the floor. The detection may be performed using weight systems. In step 618, the objects are recorded along with the associated visual profile and assessed weight.

In step 620, face detection is used to determine when the passenger has left the vehicle. After departure, visual object detection may be used to determine whether the objects associated with the passenger are still in the vehicle in step 622. In step 624, weight detection may be used to determine whether objects are still in the vehicle. In step 626, the passenger or passengers are notified using a variety of means. For example, the vehicle headlights or horn may be actuated. Text based messages may be used and sent to passenger cellphones. Visual indications may be also be provided to the passengers using LCD displays.

The vehicle may also identify and authorize the passenger through wireless communications. For example, a passenger may have a device configured to connect to onboard communication systems through Wi-Fi or Bluetooth®. The vehicle may receive an identification number (e.g., IMEA number, MAC address, UUID) assigned to the passenger along with the passenger manifest. The algorithms 500, 600 may use a combination of the aforementioned methods along with identification numbers to ensure the proper passenger enters the vehicle. The vehicle may determine that the object or device is left within the vehicle by the signal strength of the device. For example, if the passenger has left the vehicle—a determination based on face and weight detection—the vehicle may monitor the signal strength of the device used to enter the vehicle. If the signal strength is not diminishing, the vehicle may alert the passenger that it is still there, using the aforementioned methods.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a pair of cameras disposed on the vehicle and oriented to view an entrance to the vehicle; and
   a processor configured to compare a profile image of a passenger's facial feature from one camera of the pair with a frontal image of the passenger's facial feature from the other camera of the pair, and responsive to the facial features being different, lock the entrance to prevent access to an interior of the vehicle by the passenger, wherein the processor is further configured to generate a three dimensional model of the facial features using the profile image and frontal image, wherein the facial features are different when the three dimensional model is invalid.

2. The vehicle of claim 1, wherein one of the pair is disposed on a side view mirror of the vehicle and the other of the pair is disposed in a passenger cabin of the vehicle.

3. The vehicle of claim 1, wherein the facial feature is a nose.

4. The vehicle of claim 1, wherein the facial feature is a chin of the passenger.

5. A vehicle comprising:
   a pair of cameras disposed on the vehicle and oriented to view an entrance to the vehicle from different aspects; and
   a processor configured to compare a profile image of a passenger from one camera of the pair with a frontal image of the passenger from the other camera of the pair, and responsive to the front and profile images corresponding to different shapes for a same facial structure, disable the vehicle.

6. The vehicle of claim 5, wherein the processor is further configured to lock the vehicle after the passenger enters.

7. The vehicle of claim 5, wherein the processor is further configured to sound an alarm of the vehicle in response to the front and profile images corresponding to different shapes for the same facial structure.

8. The vehicle of claim 5, wherein the facial structure is an eye socket of the passenger.

9. The vehicle of claim 5, wherein the facial structure is a cheek structure of the passenger.

10. The vehicle of claim 5, wherein the facial structure is an eye color of the passenger.

11. A vehicle comprising:
    a processor configured to, responsive to
       a passenger first exiting the vehicle,
       a visual detector having cameras disposed in the vehicle and oriented to view an interior of the vehicle from different aspects recognizing an object in images taken by the cameras, and
       a mass detector having a scale disposed in the vehicle sensing a weight of the object,
    provide notification to the passenger that the object was left in the vehicle.

12. The vehicle of claim 11, wherein the notification is an electronic message.

13. The vehicle of claim 12, wherein the electronic message is an SMS message.

14. The vehicle of claim 12, wherein the electronic message is sent over vehicle 802.11 communication protocols.

15. The vehicle of claim 11, wherein the object is a cellular phone.

16. The vehicle of claim 15, wherein the notification is an audible alarm in response to the object being the cellular phone.

17. The vehicle of claim 11, wherein the visual detector performs edge detection on all objects in a field of view of the cameras.

18. The vehicle of claim 17, wherein the visual detector verifies objects recognized from the cameras.

19. The vehicle of claim 17, wherein the field of view is of an area measured by the scale.

* * * * *